(No Model.)  2 Sheets—Sheet 1.
J. PARKER.
TIRE FOR BICYCLES.
No. 579,521.   Patented Mar. 23, 1897.
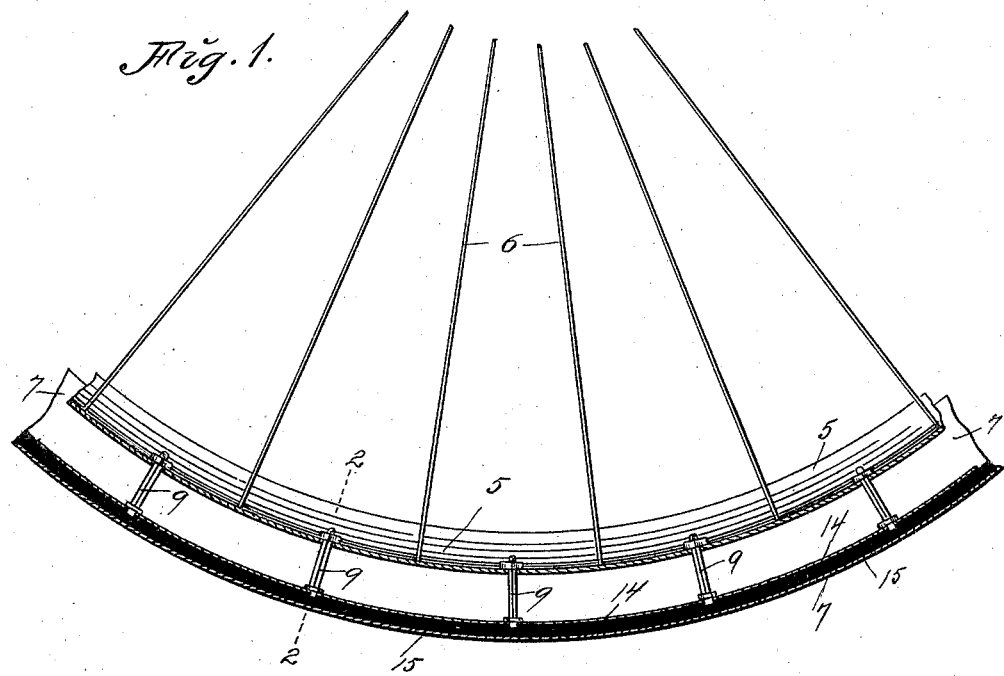
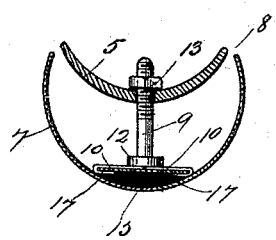
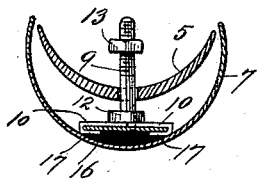
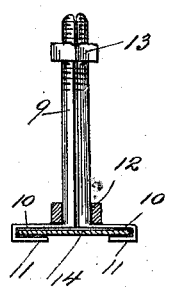
WITNESSES
C. Nordfors
M. A. Knowles
INVENTOR
Jonas Parker,
BY
Edgar Tate & Co
ATTORNEYS.

(No Model.) 2 Sheets—Sheet 2.

J. PARKER.
TIRE FOR BICYCLES.

No. 579,521. Patented Mar. 23, 1897.

WITNESSES
C. Nordfors
M. A. Knowles

INVENTOR
Jonas Parker,
BY
Edgar Tate & Co.
ATTORNEYS.

UNITED STATES PATENT OFFICE.

JONAS PARKER, OF WILLIAMSPORT, PENNSYLVANIA.

TIRE FOR BICYCLES.

SPECIFICATION forming part of Letters Patent No. 579,521, dated March 23, 1897.

Application filed July 30, 1896. Serial No. 601,011. (No model.)

*To all whom it may concern:*

Be it known that I, JONAS PARKER, a citizen of the United States, and a resident of Williamsport, in the county of Lycoming and State of Pennsylvania, have invented certain new and useful Improvements in Tires for Bicycles and Similar Vehicles, of which the following is a specification, reference being had to the accompanying drawings, forming a part thereof, in which similar numerals of reference indicate corresponding parts wherever found throughout the several views.

This invention relates to tires for bicycles and similar vehicles; and the object thereof is to provide an improved device of this class which is designed to form a substitute for the pneumatic tire and which possesses all the advantages of this class of tires with very few of their disadvantages, and which is also spring-supported and so formed as to yield in a manner similar to a pneumatic tire.

The invention is fully disclosed in the following specification, of which the accompanying drawings form a part, in which—

Figure 5:
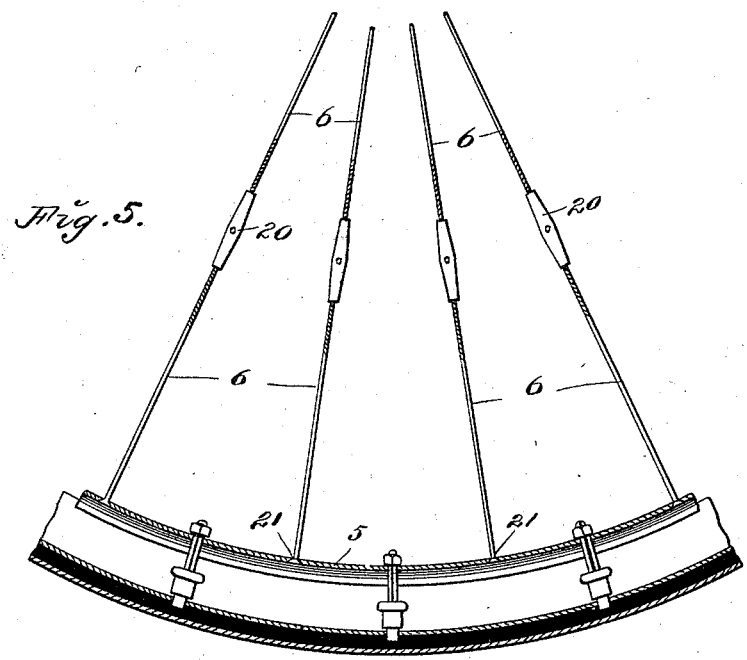
Figure 6:
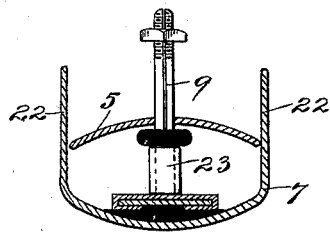

Figure 1 is a sectional side view of a portion of a wheel of a bicycle provided with my improvement; Fig. 2, a partial transverse section thereof on the line 2 2; Fig. 3, a similar sectional view showing the parts in a different position; Fig. 4, a side view of a detail of the construction, showing certain parts connected therewith in section; Fig. 5, a view similar to Fig. 1, showing a modified form of construction; and Figs. 6 and 7, cross-sections thereof similar to Figs. 2 and 3.

In the practice of my invention I provide a rim 5, with which the spokes 6 are connected in the usual manner, and said rim is segmental or circular in form in cross-section, as clearly shown in Figs. 2 and 3, and I also provide a tire 7, which is preferably composed of sheet metal and which is similar in form, and the inner portion thereof is cut away annularly, so as to form an open space 8, through which the rim 6 passes. I also provide a plurality of bolts 9, which are passed through the rim 6 at predetermined points, preferably between each of the spokes, as shown in Fig. 1, and said bolts 9 are composed of two separate parts, as shown in Fig. 4, each part being provided at its outer end with an angular arm 10, having an inwardly-directed projection 11, and the separate parts of the bolts 9 are held together by a collar 12, which may be placed thereon and secured thereto in any desired manner, a screw-thread being employed, if desired, and the inner ends of said bolts are provided with nuts or burs 13, and I also provide a ring or band 14, which consists of a piece of flat spring metal, preferably steel, which is mounted in the cross-heads formed by the arms 10 and the inwardly-directed projections 11, and this spring ring or band 14 passes entirely around the wheel, as will be readily understood, and placed thereon is another ring or band 15, of rubber, rubber and canvas, or similar material, which is of the form in cross-section shown in Figs. 2 and 3, and which is provided with a central inwardly-directed portion 16, which fits between the ends of the projections 11, and the outer portion thereof is provided with side flanges 17, which project outwardly over the inwardly-directed projections 11 of the arms 10, which are formed on or secured to the separate parts of the bolts 9 and which constitute the head thereof. This rubber ring or band 15 also extends entirely around the wheel and is secured to the tire 17 or the inner surface thereof in any desired manner, and is also secured to the ring or band 14, and when the parts are thus connected it will be seen that as the wheel revolves the tire 17 is forced inwardly, the bolts 9 passing freely through the rim 5, and the position of the rim 5 and the tire 7 on the side on which the tire rests upon the ground is shown in Fig. 3, while the position of the tire or that portion thereof which is not on the ground is shown in Fig. 2, and this movement of the tire 7 is perfectly free and regular at all times, said tire being composed of spring metal, as is also the ring or band 14, and the cushion, which consists of the ring or band 15, is also composed of elastic material.

It will also be apparent that any dirt or other substances that may collect in the tire 7 at any time may be easily removed therefrom, and a tire made in this manner is practically indestructible and will last as long as the vehicle to which it is applied, and if it becomes necessary from any reason a new tire may be substituted for the old one at any time, and the practical result secured by means of my improved tire is similar to that of the ordinary tubular elastic pneumatic tire, but my improved tire is much more durable, as will be readily understood.

Figure 7:
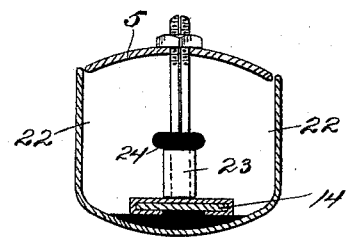

In Figs. 5 and 7, inclusive, I have shown a modified form of construction which is designed to prevent the accumulation of dust and dirt within the tire 7, and in this construction I have also shown means to prevent the ends of the spokes which project through the rim 5 from striking the tire or the ring or band 14. The latter object I accomplish by dividing the spokes centrally thereof and connecting the divided ends by means of a coupling-head 20, which is provided at its opposite ends with a right and a left screw-thread, and the adjacent ends of the spokes are similarly threaded, and the ends of the spokes that pass through the rim 5 are provided with heads, as shown at 21, and by this means the spokes may also be tightened whenever desired. In this form of construction the tire 7 is preferably provided with straight or substantially straight inwardly-directed annular sides or flanges, as shown at 22, and the rim 5 is inwardly convex in cross-section, as clearly shown in Figs. 6 and 7, and I also mount upon the bolts 9 a sleeve 23, which limits the movement of the tire on the bolts 9, and a nut 24, by which said sleeve is secured in position between the ring or band 14 and said nut. In this construction the rim 5 is adapted to throw off any dirt that may fall or collect thereon, and the danger of the tire being filled in with dirt is less than in the construction shown in Figs. 1 to 3.

Having fully described my invention, I claim as new and desire to secure by Letters Patent—

1. A wheel for bicycles and similar vehicles, provided with a rim which is segmental in cross-section, on its outer surface, and a tire which is similarly formed, said tire being connected with said rim by means of bolts which pass through and are free to move in said rim, and said bolts being provided at their outer ends with cross-heads to which are secured a ring or band of spring metal, and a bearing of rubber or similar material, which is placed between said ring or band of spring metal and said tire, substantially as shown and described.

2. A wheel for bicycles and similar vehicles, provided with a rim which is segmental in cross-section, on its outer surface, and a tire which is similarly formed, said tire being connected with said rim by means of bolts which pass through and are free to move in said rim, and said bolts being provided at their outer ends with cross-heads, to which are secured a ring or band of spring metal, and a bearing of rubber or similar material, which is placed between said ring or band of spring metal and said tire, said bolts being composed of two separate parts which are held together by a collar mounted thereon, and each of said parts being provided at their outer ends with an outwardly-directed arm, having an inwardly-directed projection by which said ring or band of spring metal is secured in place, substantially as shown and described.

3. The combination with a wheel for bicycles and similar vehicles, provided with a rim which is concave on its inner surface, and convex on its outer surface, of a tire which is similarly formed and the sides of which directed inwardly, said tire being connected with said rim by means of bolts which are free to move in said rim, and which are provided at their outer ends, with cross-heads to which is secured a ring or band of spring metal, and a suitable bearing between said ring or band of spring metal, and said tire, substantially as shown and described.

4. The combination with a wheel for bicycles and similar vehicles, provided with a rim which is concave on its inner surface, and convex on its outer surface, of a tire which is similarly formed, and the sides of which are directed inwardly, said tire being connected with said rim by means of bolts which are free to move in said rim, and which are provided at their outer ends with cross-heads to which is secured a ring or band of spring metal, and a suitable bearing between said ring or band of spring metal, and said tire, said bearing being composed of rubber or similar material, and being secured in place and to said tire, substantially as shown and described.

5. A wheel for bicycles and similar vehicles, in which the spokes are connected with the rim, and provided with a tire which is connected with said rim by means of bolts, which pass through and are free to move in said rim, said tire being provided with inwardly-directed sides or flanges, in which said rim is free to move, said bolts being provided at their outer ends with cross-heads to which are secured a ring or band of spring metal, and a bearing of rubber or similar material which is placed between said ring or band of spring metal and said tire, substantially as shown and described.

6. A wheel for bicycles and similar vehicles, in which the spokes are connected with the rim, and provided with a tire which is connected with said rim by means of bolts, which pass through and are free to move in said rim, said tire being provided with inwardly-directed sides or flanges, in which said rim is free to move, said bolts being provided at their outer ends with cross-heads to which are secured a ring or band of spring metal, and a bearing of rubber or similar material which is placed between said ring or band of spring metal and said tire, and said bolts being provided at their inner ends with nuts or burs which prevent the separation of said ring or band from said rim, substantially as shown and described.

In testimony that I claim the foregoing as my invention I have signed my name, in presence of the subscribing witnesses, this 2d day of July, 1896.

JONAS PARKER.

Witnesses:
 WILLIAM H. LISLE,
 W. M. APPLEGATE.